(12) United States Patent
Moriya et al.

(10) Patent No.: US 9,567,935 B2
(45) Date of Patent: Feb. 14, 2017

(54) FUEL CONTROL APPARATUS FOR VEHICLE AND FUEL CONTROL METHOD FOR VEHICLE

(71) Applicant: TOYOTA JIDOSHA KABUSHIKI KAISHA, Toyota-shi, Aichi-ken (JP)

(72) Inventors: Koki Moriya, Nagakute (JP); Junichi Morimura, Sunto-gun (JP); Motohiro Sato, Nisshin (JP); Yasuyuki Mikami, Toyota (JP); Takayuki Kogure, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/689,415

(22) Filed: Apr. 17, 2015

(65) Prior Publication Data
US 2015/0361917 A1 Dec. 17, 2015

(30) Foreign Application Priority Data
Jun. 13, 2014 (JP) ................................. 2014-122488

(51) Int. Cl.
*F02D 41/38* (2006.01)
*F02D 41/30* (2006.01)
(Continued)

(52) U.S. Cl.
CPC ......... *F02D 41/3082* (2013.01); *F02D 41/042* (2013.01); *F02D 41/406* (2013.01); *F02M 39/02* (2013.01); *F02M 59/42* (2013.01); *F02N 11/0814* (2013.01); *F02N 19/00* (2013.01); *B60W 20/00* (2013.01); *F02D 2041/389* (2013.01); *F02D 2200/0602* (2013.01); *F02D 2200/501* (2013.01); *F02N 11/0818* (2013.01);
(Continued)

(58) Field of Classification Search
CPC F02D 41/3082; F02D 41/406; F02N 11/0818; F02N 11/0825; F02N 11/0855
USPC ..... 123/446, 179.3, 179.4, 179.17, 497, 509
See application file for complete search history.

(56) References Cited

U.S. PATENT DOCUMENTS 6,308,129 B1 * 10/2001 Uchida ................... F02D 17/04
477/203
6,488,012 B1 12/2002 Suffredini et al.
(Continued)

FOREIGN PATENT DOCUMENTS

DE 101 41 765 A1 5/2002
DE 10 2007 058 229 A1 6/2009
(Continued)

*Primary Examiner* — Mahmoud Gimie
(74) *Attorney, Agent, or Firm* — Oliff PLC

(57) ABSTRACT

A fuel control apparatus for a vehicle, having an electric pump configured to have electric power supplied, to supply fuel from a fuel tank to an injector of an internal combustion engine through a fuel pipe, and a control unit configured to have the internal combustion engine stop automatically when a first predetermined condition is satisfied, and after having the internal combustion engine stop automatically, start automatically when a second predetermined condition is satisfied, includes an operation unit configured, when the control unit has the internal combustion engine stop automatically, to supply electric power from a predetermined electric power supply apparatus to the electric pump, to have the electric pump operate.

8 Claims, 2 Drawing Sheets

(51) Int. Cl.
*F02M 59/42* (2006.01)
*F02M 39/02* (2006.01)
*F02D 41/40* (2006.01)
*F02D 41/04* (2006.01)
*F02N 11/08* (2006.01)
*F02N 19/00* (2010.01)
*B60W 20/00* (2016.01)

(52) U.S. Cl.
CPC ........ *F02N 11/0825* (2013.01); *F02N 11/0855* (2013.01); *F02N 2019/002* (2013.01); *F02N 2200/0801* (2013.01); *F02N 2200/0809* (2013.01); *F02N 2200/101* (2013.01); *F02N 2200/102* (2013.01); *Y02T 10/48* (2013.01)

(56) References Cited

U.S. PATENT DOCUMENTS

| | | | | |
|---|---|---|---|---|
| 6,508,225 | B1* | 1/2003 | Hiki | F02B 23/104 123/198 D |
| 2008/0201064 | A1* | 8/2008 | DiGonis | F02N 11/0822 701/110 |

FOREIGN PATENT DOCUMENTS

| | | |
|---|---|---|
| DE | 10 2010 001 121 A1 | 7/2011 |
| JP | 2002-372139 A | 12/2002 |
| JP | 2004-278365 A | 10/2004 |
| JP | 2012-047148 A | 3/2012 |

\* cited by examiner

FUEL CONTROL APPARATUS FOR VEHICLE AND FUEL CONTROL METHOD FOR VEHICLE

FIELD

The disclosures herein generally relate to a fuel control apparatus for a vehicle and a fuel control method for a vehicle, especially, a fuel control apparatus for a vehicle and a fuel control method for a vehicle that automatically stop, and then, automatically start, an internal combustion engine of the vehicle having an electric pump for supplying fuel.

BACKGROUND

Conventionally, a control apparatus has been known that executes control for automatically stopping, and then, automatically starting, an internal combustion engine (see, for example, Patent Document 1). While a vehicle is traveling, such a control apparatus cuts off fuel supply when the vehicle speed is greater than or equal to a predetermined vehicle speed within a predetermined vehicle speed range, to have the internal combustion engine stop automatically, and then, to have the internal combustion engine start automatically when the vehicle speed is below the predetermined vehicle speed. This configuration can make fuel efficiency performance improved because fuel supply to the internal combustion engine is cut off by automatically stopping the internal combustion engine while the vehicle is traveling.

RELATED-ART DOCUMENTS

Patent Documents

[Patent Document 1] Japanese Laid-open Patent Publication No. 2012-47148

Incidentally, in the above control apparatus, automatic stopping of the internal combustion engine is implemented by cutting off fuel from an injector. However, while the vehicle is traveling, if a fuel pump is stopped during automatic stopping of the internal combustion engine, fuel pressure may be reduced in a fuel pipe from a downstream side of the fuel pump to the injector of the internal combustion engine, after the automatic stopping of the internal combustion engine.

In view of the above, the present invention has an object to provide a fuel control apparatus for a vehicle and a fuel control method for a vehicle that can sufficiently secure fuel pressure in the fuel pipe during automatic stopping of the internal combustion engine.

SUMMARY

According to at least one embodiment of the present invention, a fuel control apparatus for a vehicle, having an electric pump configured to have electric power supplied, to supply fuel from a fuel tank to an injector of an internal combustion engine through a fuel pipe, and a control unit configured to have the internal combustion engine stop automatically when a first predetermined condition is satisfied, and after having the internal combustion engine stop automatically, start automatically when a second predetermined condition is satisfied, includes an operation unit configured, when the control unit has the internal combustion engine stop automatically, to supply electric power from a predetermined electric power supply apparatus to the electric pump, to have the electric pump operate.

According to at least one embodiment of the present invention, a fuel control method for a vehicle having an electric pump configured to have electric power supplied, to supply fuel from a fuel tank to an injector of an internal combustion engine through a fuel pipe, and a control unit configured to have the internal combustion engine stop automatically when a first predetermined condition is satisfied, and after having the internal combustion engine stop automatically, start automatically when a second predetermined condition is satisfied, the method includes an operation process for, when the control unit has the internal combustion engine stop automatically, supplying electric power from a predetermined electric power supply apparatus to the electric pump, to have the electric pump operate when the control unit has the internal combustion engine stop automatically.

According to at least one embodiment of the present invention, it is possible to sufficiently secure fuel pressure in the fuel pipe during automatic stopping of the internal combustion engine.

DESCRIPTION OF EMBODIMENTS

In the following, specific embodiments of a fuel control apparatus for a vehicle and a fuel control method for a vehicle will be described according to the present invention with reference to the drawings.

Figure 1:
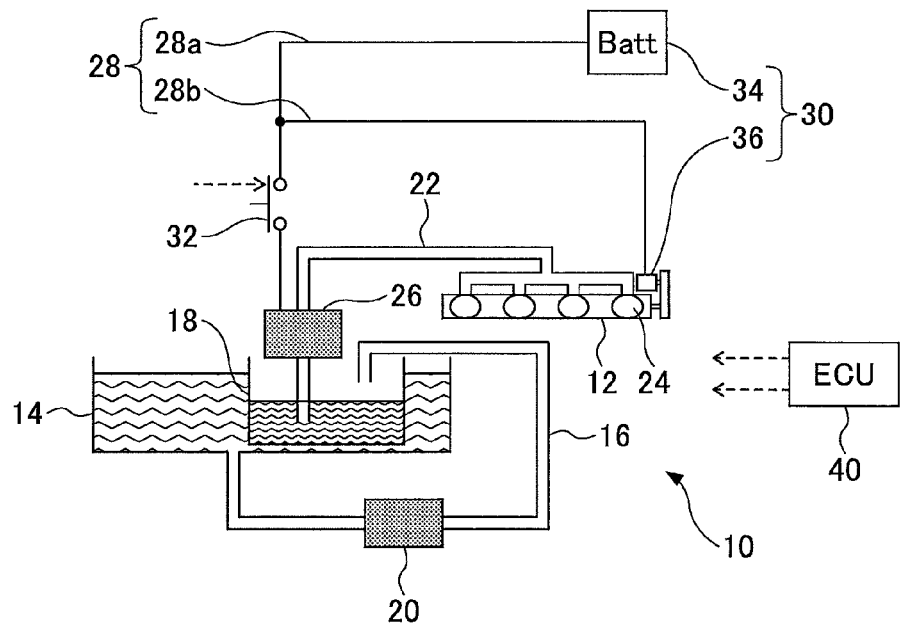
FIG. 1 is a configuration diagram of a fuel control apparatus for a vehicle according to an embodiment of the present invention.

FIG. 1 illustrates a configuration diagram of a fuel control apparatus for a vehicle 10 according to an embodiment of the present invention. the fuel control apparatus for the vehicle 10 in the present embodiment is built in a vehicle, and is an apparatus that controls fuel supply to an internal combustion engine built in the vehicle.

As shown in FIG. 1, the fuel control apparatus for the vehicle 10 includes an internal combustion engine 12 and a fuel tank 14. The internal combustion engine 12 is a heat engine to have fuel explosively combusted to obtain motive power for the vehicle. The internal combustion engine 12 can be started by a starter. The fuel tank 14 is a tank that stores fuel to be explosively combusted in the internal combustion engine 12.

The fuel tank 14 is communicated with a fuel cup 18 through a fuel pipe 16. The fuel cup 18 provided in the fuel tank 14 is a subcup that can store fuel. The ceiling of the fuel cup 18 is open. The fuel pipe 16 is a pipe that has one end connected with the bottom part of the fuel tank 14, and the other end open above the fuel cup 18. A jet pump 20 is disposed on the fuel pipe 16. When being operated, the jet pump 20 is a pump that suctions fuel stored in the fuel tank 14 to supply the fuel to the fuel cup 18. The jet pump 20 operates, for example, on negative pressure that is generated by using a venturi effect occurring when the fuel returns from a downstream side of the fuel pump 26 of the fuel pipe 22 to the fuel tank 14.

The fuel cup 18 is communicated with injectors 24 provided in the internal combustion engine 12, through the fuel pipe 22. Each of the injectors 24 is an apparatus that injects fuel into a cylinder of the internal combustion engine 12. The fuel pipe 22 is a pipe that has one end connected with the fuel cup 18, and the other end connected with the injectors 24. The fuel pipe 22 extends towards the rear side of the vehicle from the fuel cup 18 side to the injectors 24 side. Namely, the fuel pipe 22 is formed so that the fuel circulating from the fuel cup 18 side to the injectors 24 side flows towards the rear side of the vehicle.

The fuel pump 26 is disposed on the fuel pipe 22. When being operated, the fuel pump 26 is a pump that suctions fuel that is stored in the fuel cup 18, and supplies the fuel (supplies by pressure) to the injectors 24. The injectors 24 inject high-pressure fuel that has been suctioned by the fuel pump 26. The fuel pump 26 is an electric pump that operates when electric power is supplied. The fuel pump 26 is connected with an in-vehicle power source 30 via a power line 28, and operates when electric power is supplied from the in-vehicle power source 30. A main relay 32 is provided on the power line 28. The main relay 32 is a relay that switches on and off electrical continuity between the fuel pump 26 and the in-vehicle power source 30.

The in-vehicle power source 30 includes a battery 34 that is built in the vehicle, and capable of being charged and discharged, and an alternator 36 that generates power by using the drive of the internal combustion engine 12 as a power source. The fuel pump 26 operates when electric power is supplied from one of the battery 34 and the alternator 36. The power line 28 is branched halfway into a power line 28a connected with the battery 34, and a power line 28b connected with the alternator 36.

The fuel control apparatus for the vehicle 10 includes an electronic control unit (ECU) 40 that is mainly configured with a microcomputer. The ECU 40 is electrically connected with the main relay 32. By controlling opening and closing of the main relay 32, the ECU 40 controls operations of the fuel pump 26. Also, the ECU 40 is electrically connected with actuators including the injectors 24 and the starter that are provided in the internal combustion engine 12. The ECU 40 controls driving the actuators in the Internal combustion engine 12 that includes controlling operations of the injectors 24, namely, injecting fuel into the cylinders of the internal combustion engine 12.

Figure 2:
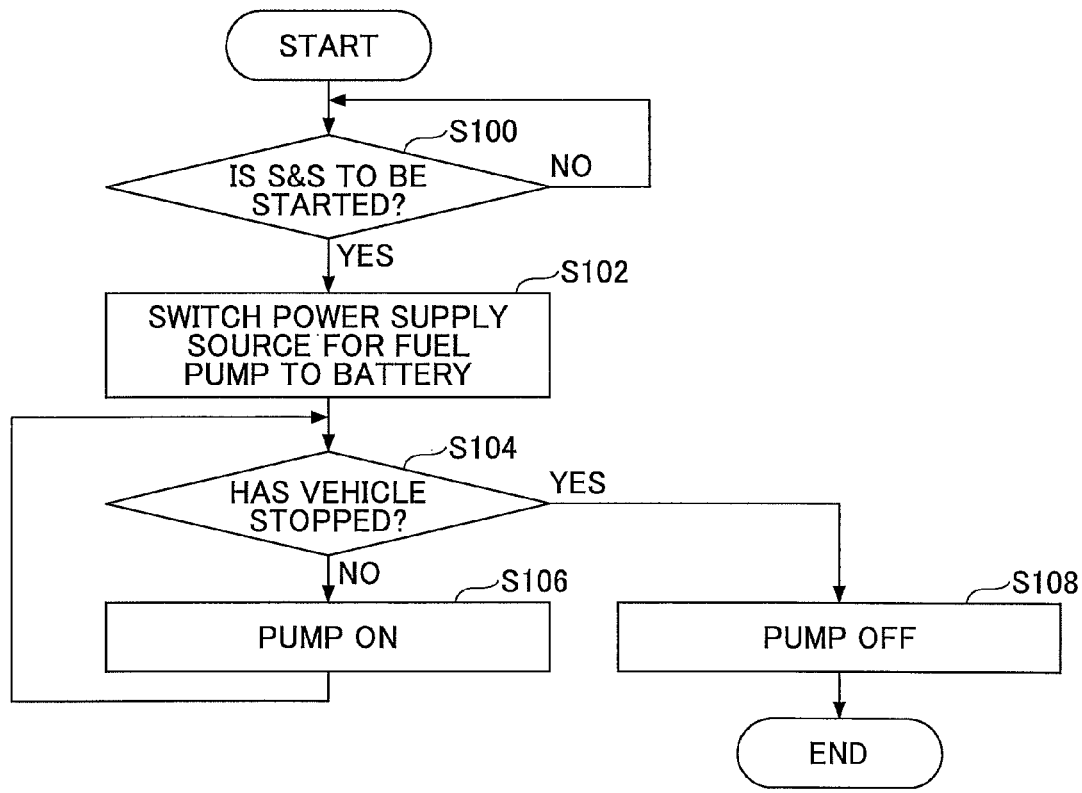
FIG. 2 is a flowchart of an example of a control routine executed in a fuel control apparatus for a vehicle and a fuel control method for a vehicle in the present embodiment.
Figure 3A:
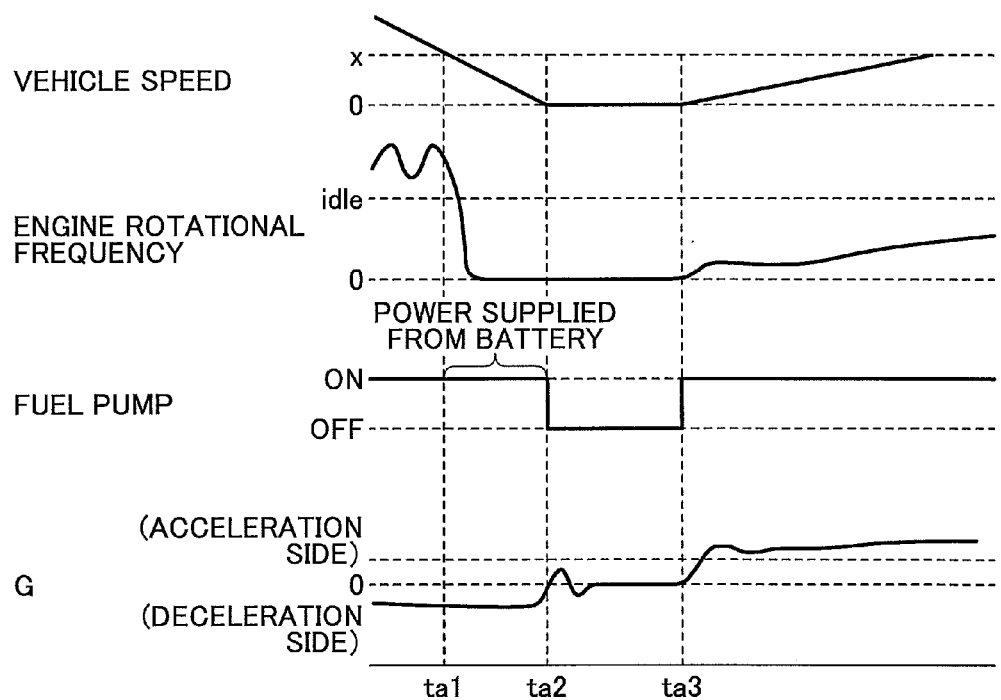
FIGS. 3A-3B are examples of operational timing charts of a fuel control apparatus for a vehicle and a fuel control method for a vehicle in the present embodiment.
Figure 3B:
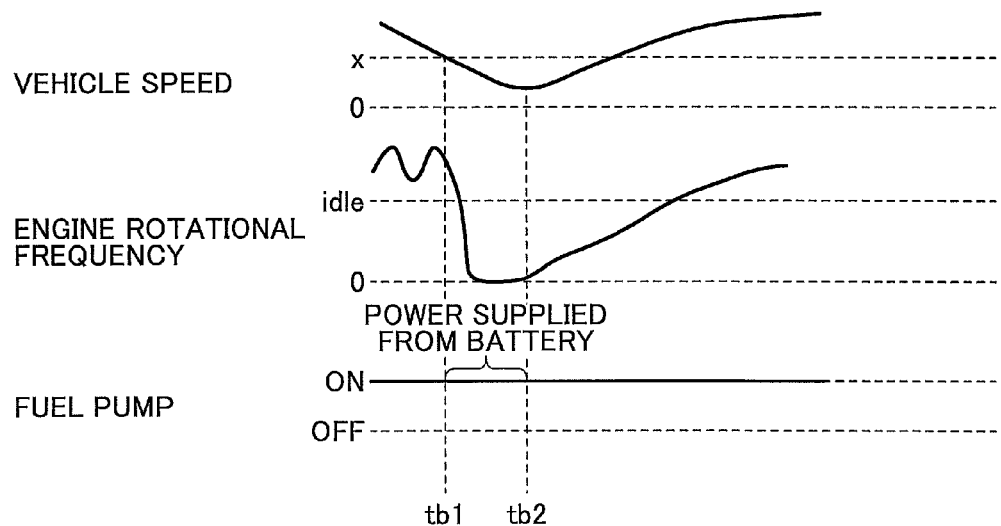

In the following, with reference to FIGS. and 3, operations of the fuel control apparatus for the vehicle 10 will be described according to the present embodiment. FIG. 2 illustrates a flowchart of an example of a control routine executed in the fuel control apparatus for the vehicle 10 in the present embodiment. Also, FIGS. 3A-3B illustrate examples of operational timing charts of the fuel control apparatus for the vehicle in the present embodiment. Note that FIG. 3A illustrates a case in which the vehicle is stopped during S&S control, which will be described later, and FIG. 3B illustrates a case in which the vehicle is not stopped during the S&S control.

In the present embodiment, the fuel control apparatus for the vehicle 10 has the ECU 40 execute control for having the internal combustion engine 12 stop automatically when a predetermined start condition is satisfied, and after the automatic stopping of the internal combustion engine 12, having the internal combustion engine 12 start automatically when a predetermined termination condition is satisfied. In the following, the control is referred to as the "stop-and-start (S&S) control".

The predetermined start condition in the S&S control is that the vehicle decelerates (for example, the vehicle speed reduces to a predetermined vehicle speed or lower (for example, km/h or 15 km/h); or the deceleration of the vehicle is greater than or equal to a predetermined deceleration), which may take place when the driver performs a pedaling operation on a brake pedal for braking, after the internal combustion engine 12 has been started to make the vehicle start traveling. Also, the predetermined termination condition includes that, after the S&S control has started, the braking operation is released; an acceleration operation is performed; the electric load in the vehicle becomes greater than or equal to a predetermined value; and the like.

When detecting that a turn-on operation is performed on an ignition switch by the driver, the ECU 40 has the main relay 32 turn on to have the fuel pump 26 operate, to start supplying fuel (supplying by pressure) to the injectors 24. Also, when detecting that a turn-on operation is performed on a starter switch, the ECU 40 has the starter and the injectors 24 operate to start the internal combustion engine 12.

After having the internal combustion engine 12 driven, the vehicle can travel thereafter, and the alternator 36 generates power by the drive of the internal combustion engine 12. At this moment, since electric power from the alternator 36 is supplied to the fuel pump 26, the fuel pump 26 operates on the electric power supplied from the alternator 36, instead of electric power supplied from the battery 34.

After the vehicle has started traveling by the drive of the internal combustion engine 12, the ECU 40 determines whether the start condition of the S&S control is satisfied, based on, for example, whether a brake operation has been performed and the vehicle speed reduces to the predetermined vehicle speed (Step S100). Step S100 is repeatedly executed until the ECU 40 determines that the start condition of the S&S control is satisfied. Then, if the ECU determines that the start condition of the S&S control is satisfied, the ECU 40 starts executing the S&S control to have the internal combustion engine 12 stop automatically (time ta1 and time tb1 in FIGS. 3A and 3B, respectively). Specifically, the ECU 40 has the actuators including the injectors 24 in the internal combustion engine 12 stop driving. When the internal combustion engine 12 stops automatically, the vehicle is not driven by the internal combustion engine 12, and decelerates while traveling by inertia.

Even after determining that the start condition of the S&S control is satisfied, or after automatic stopping of the internal combustion engine 12 starts after the S&S control has started, the ECU keeps the main relay 32 turned on to have the fuel pump 26 continue its operation (Step S102). When having the internal combustion engine 12 stop automatically, power generation of the alternator 36 stops. Therefore, during the automatic stopping of the internal combustion engine 12, the fuel pump 26 operates on electric power supplied from the battery 34, instead of electric power supplied from the alternator 36.

After starting the S&S control, the ECU 40 has the internal combustion engine 12 stop automatically, and while having the fuel pump 26 continue to operate, determines whether the vehicle has stopped by deceleration (Step S104). This determination may be executed, based on whether the vehicle speed is zero, based on an output of a vehicle speed sensor that detects the vehicle speed. Consequently, if determining that the vehicle has not stopped, the ECU 40 keeps the main relay 32 turned on to have the fuel pump 26 continue to operate (Step S106). On the other hand, if determining that the vehicle has stopped, the ECU 40 has the main relay 32 turned off to have the fuel pump 26 stop operating (Step S108; time ta2 in FIG. 3A).

Also after starting the S&S control, the ECU 40 determines whether the termination condition of the S&S control described above is satisfied. This step is repeatedly executed during execution of the S&S control. Then, if determining that the termination condition of the S&S control is satisfied, the ECU 40 ends the execution of the S&S control, and has the internal combustion engine 12 start automatically (time ta3 and time tb2 in FIGS. 3A and 3B, respectively). Having the internal combustion engine 12 start automatically, the vehicle can travel by the drive of the internal combustion engine 12 thereafter, and the fuel pump operates on electric power supplied by power generation of the alternator 36.

In this way, in the fuel control apparatus for the vehicle 10 in the present embodiment, by executing the S&S control, the internal combustion engine 12 starts automatic stopping, and during automatic stopping, the main relay 32 is kept turned on to have the fuel pump 26 continue to operate. Namely, after the internal combustion engine 12 has started stopping automatically, the main relay 32 is kept turned on, to have the fuel pump 26 continue to operate on the electric power supplied from the battery 34, instead of the electric power supplied from the alternator 36.

In the configuration in the present embodiment, which is different from a configuration in which the fuel pump 26 stops operating at the same time when the internal combustion engine 12 stops automatically by the S&S control, fuel pressure in the fuel pipe 22 can be sufficiently secured during the automatic stopping of the internal combustion engine 12 by the S&S control.

Especially, in the present embodiment, as described above, the fuel pipe 22 is formed so that the fuel circulating from the fuel cup 18 side to the injectors 24 side flows towards the rear of the vehicle. In this structure, if the fuel pump 26 stops operating at the same time when the internal combustion engine 12 stops automatically by the S&S control, when the vehicle decelerates due to the automatic stopping of the internal combustion engine 12 by the S&S control, fuel in the fuel pipe 22 may flow backward to come out on the fuel cup 18 side, and the fuel pressure may be reduced in the fuel pipe 22. In contrast to this, in the present embodiment, as described above, even when the vehicle decelerates due to automatic stopping of the internal combustion engine 12 by the S&S control, the fuel pressure in the fuel pipe 22 can be sufficiently secured because the fuel pump 26 continues to operate.

Therefore, according to the present embodiment, after automatic stopping of the internal combustion engine 12 by the S&S control, when the termination condition of the S&S control is satisfied to automatically start the internal combustion engine 12, fuel injection into the cylinders can be executed by the injectors 24 with sufficient pressure, automatic starting of the internal combustion engine 12 can be securely implemented.

Also, in the present embodiment, even when the fuel pump 26 operates on electric power supply from the battery 34 during the automatic stopping of the internal combustion engine 12 by the S&S control, if the vehicle stops due to continuation of the S&S control, the main relay 32 is turned off to have the fuel pump 26 stop operating by the electric power supplied from the battery 34.

While the vehicle stops, unlikely while the vehicle decelerates, backward flowing of the fuel into the fuel pipe 22 is not promoted, the fuel in the fuel pipe 22 hardly comes out on the fuel cup side. Therefore, if the fuel pump 26 stops operating while the vehicle stops, the fuel pressure in the fuel pipe 22 is secured. Also, if the fuel pump 26 stops operating, the electric power in the battery 34 is restricted to be taken out. Therefore, according to the present embodiment, after the vehicle stops during execution of the S&S control, the fuel pump 26 stops operating on the electric power supply from the battery 34. Therefore, power consumption of the battery 34 can be suppressed, while the fuel pressure in the fuel pipe 22 is secured. Thus, while restartability of the internal combustion engine 12 is secured, it is possible to suppress reduction of the fuel efficiency caused by the drive of the internal combustion engine 12 due to the reduced remaining capacity of the battery 34.

Note that, in the above embodiments, the fuel pipe 22 corresponds to a "fuel pipe" described in the claims; the fuel pump 26 corresponds to a "electric pump" described in the claims; the start condition of the S&S control corresponds to a "first predetermined condition" described in the claims; the termination condition of the S&S control corresponds to a "second predetermined condition" described in the claims; the ECU 40 executing the S&S control corresponds to a "control unit" described in the claims; the battery 34 corresponds to a "predetermined electric power supply apparatus" described in the claims; the ECU 40 executing Steps S102 and S106 in the routine illustrated in FIG. 2 corresponds to an "operation unit" or an "operation process" described in the claims; and the ECU 40 executing Step S108 corresponds to an "operation stopping unit" or an "operation stop process" described in the claims.

Incidentally, in the above embodiments, the fuel pipe 22 extends towards the rear side of the vehicle from the fuel cup 18 side to the injectors 24 side, and is formed so that the fuel circulating from the fuel cup 18 side to the injectors 24 side flows towards the rear side of the vehicle. Therefore, when the vehicle decelerates due to automatic stopping of the internal combustion engine 12 by the S&S control, the fuel in the fuel pipe 22 may flow backward. However, it is not necessary to have the entirety of the fuel pipe 22 extend towards the rear side of the vehicle from the fuel cup 18 side to the injectors 24 side, and formed so that the fuel circulating from the fuel cup 18 side to the injectors 24 side flows towards the rear side of the vehicle. It is sufficient that at least a part of the fuel pipe 22 includes a path that extends towards the rear side of the vehicle from the fuel cup 18 side to the injectors 24 side, and is formed so that the fuel circulating from the fuel cup 18 side to the injectors 24 side flows towards the rear side of the vehicle. Also, the path does not necessarily extend straight towards the rear side of the vehicle from the fuel cup 18 side to the injectors 24 side, but may extend obliquely backward.

Also, in the above embodiments, the fuel control apparatus for the vehicle 10 has a structure that includes the fuel cup 18 as a subcup to store fuel, apart from the main body of the fuel tank 14. However, the present invention is not limited to it, but the fuel control apparatus for the vehicle 10 may only include the fuel tank 14 without a subcup, for storing fuel. Also, in this case, the jet pump 20 may not be included.

Also, in the above embodiments, during the automatic stopping of the internal combustion engine 12 by the S&S control, electric power is supplied to the fuel pump 26 by using the battery 34 built in the vehicle. However, the present invention is not limited to it, as electric power can be supplied to the fuel pump 26 by using a capacitor or the like built in the vehicle.

The present application is based on Japanese Priority Application No 2014-122488, filed on Jun. 13, 2014, the entire contents of which are hereby incorporated by reference.

The invention claimed is:

1. A fuel control apparatus for a vehicle, including
an electric pump configured to receive electric power to supply fuel from a fuel tank to an injector of an internal combustion engine through a fuel pipe,
a control unit configured to have the internal combustion engine stop automatically when a first predetermined condition is satisfied, and after having the internal combustion engine stop automatically, start automatically when a second predetermined condition is satisfied,
an operation unit configured to supply electric power from a predetermined electric power supply apparatus to the electric pump to have the electric pump operate when the control unit has the internal combustion engine stop automatically, and
an operation stopping unit configured to have the electric pump stop operating when the vehicle stops after the operation unit has had the electric pump start operating.

2. The fuel control apparatus for the vehicle, as claimed in claim 1, wherein after the control unit starts having the internal combustion engine stop automatically, the operation unit starts supplying the electric power from the predetermined electric power supply apparatus to the electric pump, to have the electric pump operate.

3. The fuel control apparatus for the vehicle, as claimed in claim 1, wherein after the operation unit has started having the electric pump start operating, the operation stopping unit has the electric pump stop operating when the vehicle stops, and fuel pressure in the fuel pipe is greater than or equal to predetermined pressure.

4. The fuel control apparatus for the vehicle, as claimed in claim 1, wherein
the fuel pipe includes a path in which the fuel circulating from a side of the fuel tank to a side of the injector flows towards the rear of the vehicle, and
the first predetermined condition includes a deceleration operation that has been performed for the vehicle while the vehicle is traveling.

5. A fuel control method for a vehicle comprising
an electric pump configured to receive electric power to supply fuel from a fuel tank to an injector of an internal combustion engine through a fuel pipe, and
a control unit configured to have the internal combustion engine stop automatically when a first predetermined condition is satisfied, and after having the internal combustion engine stop automatically, start automatically when a second predetermined condition is satisfied, the method comprising:
supplying electric power from a predetermined electric power supply apparatus to the electric pump to have the electric pump operate when the control unit has the internal combustion engine stop automatically, and then
stopping the electric pump from operating when the vehicle stops.

6. The fuel control method for the vehicle, as claimed in claim 5, wherein after the control unit starts having the internal combustion engine stop automatically, the electric power is supplied from the predetermined electric power supply apparatus to the electric pump to have the electric pump operate.

7. The fuel control method for the vehicle, as claimed in claim 5, wherein after the electric power is supplied to the electric pump from the predetermined electric power supply apparatus and the electric pump starts operating, the electric pump stops operating when the vehicle stops, and fuel pressure in the fuel pipe is greater than or equal to predetermined pressure.

8. The fuel control method for the vehicle, as claimed in claim 5, wherein
the fuel pipe includes a path in which the fuel circulating from a side of the fuel tank to a side of the injector flows towards the rear of the vehicle,
the first predetermined condition includes a deceleration operation that has been performed for the vehicle while the vehicle is traveling.

* * * * *